Dec. 9, 1969     A. RIEDEL ET AL     3,482,797
CARTRIDGE FOR ROLL FILM
Filed Oct. 23, 1967

INVENTOR.
ANTON RIEDEL
GUENTHER KAISER
BY
Michael S. Striker
Attorney

United States Patent Office 3,482,797
Patented Dec. 9, 1969

3,482,797
CARTRIDGE FOR ROLL FILM
Anton Riedel, Gauting, and Guenther Kaiser, Munich, Germany, assignors to Agfa-Gevaert Aktiengesellschaft, Leverkusen, Germany
Filed Oct. 23, 1967, Ser. No. 677,104
Int. Cl. G03b 1/04
U.S. Cl. 242—71.1                                                                                     8 Claims

ABSTRACT OF THE DISCLOSURE

A two-piece cartridge for roll film comprises a casing in the form of a tube one end of which is open and the other end of which is sealed by an end wall, and a spool having a core with two flanges one of which is received in the tube adjacent to the end wall and the other of which is sealingly but rotatably received in the open end of the tube. The peripheral surface of the other flange is provided with annular ribs extending into complementary grooves provided in the internal surface of the tube, and the latter has a film mouth which extends in parallelism with the core from the end wall and all the way to its open end. The thickness of the other flange is a multiple of the thickness of the one flange.

BACKGROUND OF THE INVENTION

The present invention relates to cartridges for roll film, particularly to improvements in cartridges which are used for storage of 35-millimeter film.

It is already known to assemble a cartridge for roll film of a longitudinally slotted tube whose ends are open and whose internal surface is coated with a sealing material, and of a spool whose flanges are sealingly received in the open ends of the tube. The sealing material is often contaminated in response to repeated insertion and withdrawal of the spool whereby the contaminants scratch or otherwise damage the film on the core of the spool. Furthermore, repeated insertion and removal of the core causes such deformation of the tube that the internal liner of the tube is unable to provide a lightproof seal. Therefore, manufacturers of cartridges for roll film prefer to assemble cartridges of three or more parts which consist of sheet metal or plastic. Sheet metal cartridges normally comprises a tube each end of which carries a separable end wall or cap, and a customary spool or reel having a core whose ends are journalled in the caps. Plastic cartridges normally comprise a tube or shell having multiple external threads to take internally threaded caps. Such plastic cartridges are produced by injection molding and are quite expensive because the injection molding operation must be carried out with a high degree of precision in order to insure that the mating threads of the tube and cap or caps will prevent entry of light. Furthermore, rolling of unexposed film onto the core of a three- or four-piece cartridge consumes much time because empty cartridge must be taken apart into three or more components prior to rolling of film onto the core of the spool and because all of the components must be reassembled subsequent to rolling. The time factor is particularly important when the cartridges are loaded with film in automatic machines.

Summary of the invention

It is an object of our invention to provide a novel and improved cartridge for roll film which comprises only two parts, which can be manipulated by automatic machinery with little loss in time, which can be manufactured at a low cost, which can provide an absolutely lightproof enclosure for unexposed film, which need not occupy more room than a conventional cartridge, which can be manufactured of a wide variety of available materials, wherein the spool or reel performs its customary function and also another important function, which occupies less space in storage than heretofore known cartridges if its component parts are stored separately and wherein the mouth contributes to the sealing action between the casing and the spool.

The improved cartridge comprises a casing including a tubular portion or shell having an open first end and a second end, an end wall which is integral with the tubular portion and seals the second end thereof, and a spool or reel including a core which extends into the tubular portion and has a flange carried by the core and sealingly received in the first end of the tubular portion. A second flange may be provided on the core adjacent to the end wall and the thickness of the first mentioned flange is preferably a multiple of the thickness of the second flange. Also, the mouth of the tubular portion preferably extends all the way to the open end so that the first mentioned flange of the spool can be readily fitted into the tubular porion and that the sealing strips in the mouth contribute to sealing action by engaging the peripheral surface of the respective flange.

Description of the preferred embodiment

Figure 1:
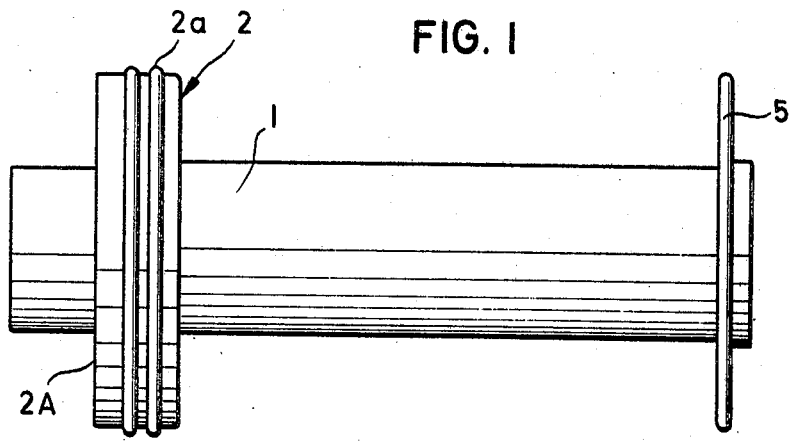
FIG. 1 is a side elevational view of a spool which constitutes one element of the improved cartridge.
Figure 3:
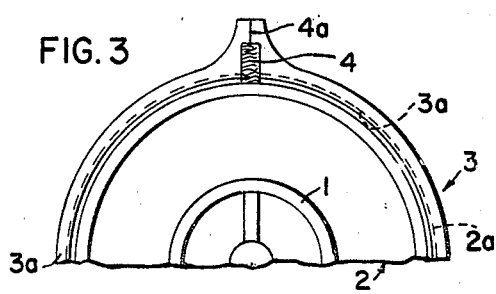
FIG. 3 is a fragmentary end elevational view as seen from the left-hand side of FIG. 1.

Referring first to FIGS. 1 and 3, there is shown a spool or reel which comprises a solid or hollow cylindrical core 1 carrying a relatively thin disk-shaped flange 5 at one end and a relatively thick second disk-shaped flange 2 at the other end. The peripheral surface of the flange 2 is provided with one, two or more annular ribs or projections 2a and the thickness of the flange 2 is preferably a whole multiple of the thickness of the flange 5. The spool may consist of metallic or plastic material and the flanges 2, 5 are preferably integral with the core 1.

Figure 2:
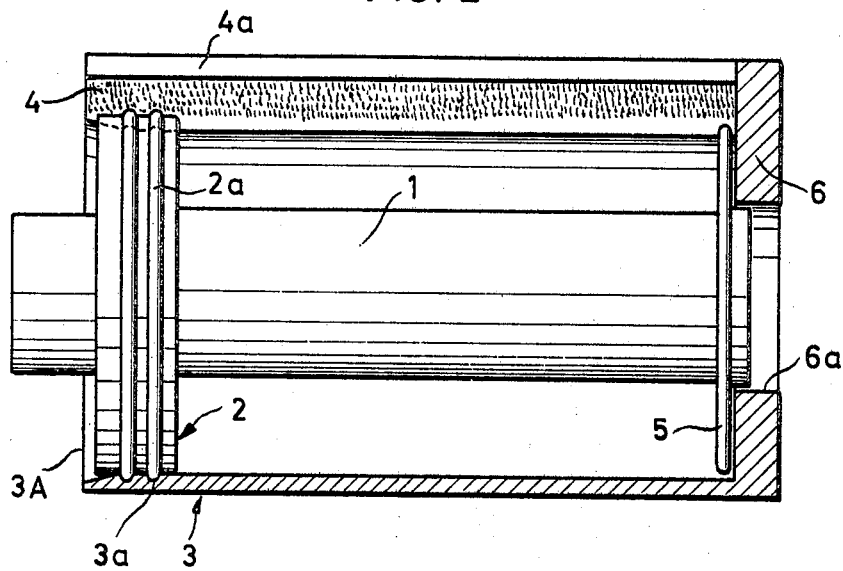
FIG. 2 is an axial sectional view of a fully assembled cartridge.

The casing of the cartridge is shown in FIG. 2. This casing comprises a tubular portion or shell 3 having an open end 3A and a second end closed by an integral end wall 6. The shell 3 and the end wall 6 may consist of plastic or metallic material, i.e., the material of parts 3, 6 may be identical with or different from the material of parts 1, 2 and 5. The open end 3A receives the flange 2 and the other flange 5 is located in the interior of the tubular portion 3 adjacent to the end wall 6. The right-hand end portion 1a of the core 1 is journalled in the end wall 6 or extends with some clearance into a central opening 6a of this end wall. The internal surface of the tubular portion 3 is provided with annular grooves 3a which receive the ribs 2a of the flange 2 when the spool is properly inserted into the casing. The outer side 2A of the flange 2 is then flush or nearly flush with the open end 3A and the ribs 2a snap into the respective recesses 3a to provide a satisfactory sealing action.

The tubular portion 3 has a radially outwardly extending slot 4a which is parallel with the axis of the core 1 and extends from the end wall 6 all the way to the open end 3A. The slot 4a forms a mouth and is lined by strips or lips 4 of sealing material which is glued or otherwise secured to the tubular portion 3.

It is clear that the position of the ribs 2a and grooves 3a can be reversed, i.e., that the tubular portion 3 may be provided with internal annular ribs extending into peripheral grooves of the flange 2. Also, the flange 2 can be provided with one or more ribs and with one or more grooves, and the same applies for the tubular portion 3.

Furthermore, the mouth of the tubular portion 3 could extend tangentially, rather than radially. Since the slot 4a extends all the way to the open end 3A of the tubular portion 3, the latter can yield when the flange 2 is inserted and then snaps back to provide a satisfactory lightproof seal around the peripheral surface of the flange 2. Also, the material of the sealing strips 4 engages with the adjoining portion of the flange 2 to prevent penetration of light into the tubular portion 3.

Since the improved cartridge comprises only two parts, it can be manufactured at reasonable cost in simple and commercially available machines. Automatic loading of the cartridge is simplified due to the fact that withdrawal of an empty spool from and reinsertion of a film-carrying spool into the casing consumes little time. The dimensions of the ribs 2a are selected in such a way that insertion or withdrawal of the spool does not require too much force but that the ribs contribute significantly to the sealing action at the open end 3A of the tubular portion 3. It is clear that all of the ribs 2a may but need not have identical dimensions. The sealing strips 4 may consist of felt, velvet, plush or like material.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. A cartridge for roll film, comprising a casing including a tubular portion having an open first end and a second end provided with a transverse end wall extending inwardly from said tubular portion; and a spool including a core in said tubular portion, said core having forward and rear ends respectively located in the regions of the second and first ends of said tubular portion, a first flange in the region of the rear end of said core and having a peripheral surface sealingly engaging the internal surface of said tubular portion in the region of said first end, and a second flange located at the forward end of said core and having a face parallel to and abutting against said end wall, said flanges thus light-tightly sealing said casing while permitting removal of said spool from said casing through the first end of said tubular portion.

2. A cartridge for roll film, comprising a casing including a tubular portion having an open first end and a second end provided with a transverse end wall extending inwardly from said tubular portion, said tubular portion further having in the region of said first end an internal surface provided with circumferential ridges and grooves; and a spool including a core extending into said casing and having forward and rear ends respectively located in the regions of said end wall and the first end of said tubular portion, and a flange carried by said core and having a peripheral surface provided with ridges and grooves engaging the grooves and ridges of said internal surface so as to light-tightly seal the first end of said tubular portion while permitting removal of said spool through said first end.

3. A cartridge as defined in claim 1, particularly for 35-millimeter film, wherein said tubular portion has an elongated mouth extending from said end wall and all the way to said first end thereof.

4. A cartridge as defined in claim 2, wherein said spool includes a second flange carried by said core and located in said tubular portion immediately adjacent to said end wall.

5. A cartridge as defined in claim 1, wherein said flanges are disks and wherein the thickness of said first flange is a multiple of the thickness of said second flange.

6. A cartridge as defined in claim 1, wherein said first flange has an exposed side which is substantially flush with the first end of said tubular portion.

7. A cartridge as defined in claim 1, wherein said casing and said spool consist of different materials.

8. A cartridge as defined in claim 1, wherein said spool and said casing consist of identical materials.

References Cited

UNITED STATES PATENTS

| | | | |
|---|---|---|---|
| 1,987,247 | 1/1935 | Schnitzler | 96—78 |
| 2,032,213 | 2/1936 | Howell | 242—71.1 |
| 2,191,849 | 2/1940 | Debrie | 242—71.1 |
| 2,574,883 | 11/1951 | Medal. | |

NATHAN L. MINTZ, Primary Examiner